(12) United States Patent
Sakamoto

(10) Patent No.: US 8,835,707 B2
(45) Date of Patent: Sep. 16, 2014

(54) METHOD OF ASBESTOS DETOXIFICATION

(75) Inventor: Kajiro Sakamoto, Yokohama (JP)

(73) Assignee: Street Design Corp., Yokohama-shi (JP)

( * ) Notice: Subject to any disclaimer, the term of this patent is extended or adjusted under 35 U.S.C. 154(b) by 744 days.

(21) Appl. No.: 12/530,989

(22) PCT Filed: Mar. 7, 2008

(86) PCT No.: PCT/JP2008/054164
§ 371 (c)(1),
(2), (4) Date: Sep. 11, 2009

(87) PCT Pub. No.: WO2008/111512
PCT Pub. Date: Sep. 18, 2008

(65) Prior Publication Data
US 2010/0048976 A1    Feb. 25, 2010

(30) Foreign Application Priority Data
Mar. 12, 2007    (JP) ................... 2007-061291

(51) Int. Cl.
*A62D 3/40* (2007.01)
*A62D 3/33* (2007.01)
*A62D 3/36* (2007.01)
*B09B 3/00* (2006.01)
*A62D 101/41* (2007.01)

(52) U.S. Cl.
CPC .............. *B09B 3/0066* (2013.01); *A62D 3/40* (2013.01); *A62D 3/33* (2013.01); *A62D 3/36* (2013.01); *A62D 2203/02* (2013.01); *A62D 2101/41* (2013.01)
USPC ......................................... 588/411; 588/321

(58) Field of Classification Search
None
See application file for complete search history.

(56) References Cited

U.S. PATENT DOCUMENTS 4,347,150 A * 8/1982 Arpin ............................ 510/110
4,678,493 A * 7/1987 Roberts et al. ................ 588/254
(Continued)

FOREIGN PATENT DOCUMENTS

JP    62237984 A    10/1987
JP    1-141847      6/1989
(Continued)

OTHER PUBLICATIONS

Oh, KR 2004104973 Jun. 2003, Abstract only.*
(Continued)

*Primary Examiner* — Melvin C Mayes
*Assistant Examiner* — Sheng H Davis
(74) *Attorney, Agent, or Firm* — Marshall, Gerstein & Borun LLP

(57) ABSTRACT

An asbestos detoxification method comprising a step B1 of impregnating an existing asbestos layer with an asbestos melting agent and detaching the existing asbestos layer; a step B2 of pulverizing the existing asbestos layer; a step B3 of loading the pulverized material obtained in step B2 into a melting furnace; a step B4 of heating a resin subsidiary material used in the disposal of the asbestos layer to vaporize the resin portion thereof and further converting the vaporized resin portion into plastic oil; a step B5 of combusting either or both of the plastic oil obtained in step B4 and a fuel; and a step B6 of heating and melting the pulverized material that is in the melting furnace with the use of the heat obtained in step B5. By this detoxification method, it is possible not only to detoxify asbestos sprayed onto a surface of a base material such as a base material of a building, or asbestos-containing building material at low energy, but also to detoxify and recycle various subsidiary materials that are used in the detoxification and are required to be disposed of as specially controlled industrial waste, at the same time.

16 Claims, 5 Drawing Sheets

(56) References Cited

U.S. PATENT DOCUMENTS

| | | | |
|---|---|---|---|
| 5,017,016 A * | 5/1991 | Nasu | 366/139 |
| 5,096,692 A * | 3/1992 | Ek | 423/659 |
| 5,704,988 A * | 1/1998 | Lyons | 134/10 |
| 5,753,035 A * | 5/1998 | Block | 106/699 |
| 2002/0033124 A1* | 3/2002 | Asanuma et al. | 110/346 |
| 2005/0096495 A1* | 5/2005 | Mason et al. | 588/252 |

FOREIGN PATENT DOCUMENTS

| | | | |
|---|---|---|---|
| JP | 01250558 A | | 10/1989 |
| JP | 3085959 A | | 4/1991 |
| JP | 06170352 A | | 6/1994 |
| JP | 08285249 | * | 11/1996 |
| JP | 2004-033986 A | | 2/2004 |
| JP | 2005134554 A | | 5/2005 |
| JP | 2007308871 A | | 11/2007 |

OTHER PUBLICATIONS

International Search Report for PCT/JP2008/054164 dated Apr. 8, 2008.

Notification of Reasons for Rejection for Japanese Application No. 2009-504028, dated May 28, 2013.

Decision of Refusal for Japanese Application No. 2009-504028, dated May 7, 2014.

* cited by examiner

METHOD OF ASBESTOS DETOXIFICATION

FIELD OF THE INVENTION

The present invention relates to a method of disposing asbestos that has been sprayed onto a base material such as a building material, for example, a ceiling or a wall, or an iron frame and, more specifically, to an asbestos detoxification method by which asbestos is sealed inside another substance in order to suppress scattering thereof, removed, and then melted.

BACKGROUND ART

In recent years, not only asbestos scattering in spray work but also decaying, degrading, and detaching and scattering after spraying have caused large problems, and asbestos pollution has become a significant problem. That is, asbestos that is light-weight and fine easily scatters in the air. Asbetos has a spiny shape like a small bone in a fish and, therefore, once it sticks in mucous membrane or the like, it is rather difficult to discharge asbestos out of a human body using the self-cleaning function of the human body.

It is said that various health disorders and diseases are brought about for this reason. It has also been indicated that asbestos inhalation causes pleural apex (pleural thickening), lung asbestos (asbestis), or emphysema, and further causes malignant mesothelioma or lung cancer. Furthermore, these disorders and diseases are said to develop 10 to 20 years later after inhalation. Therefore, countermeasures must be taken now as soon as possible.

At present, with respect to asbestos sprayed onto a ceiling or the like, after measures are taken such that workers are wrapped up in fully protective work suits and the object is enclosed with a resin sheet so as to prevent the asbestos from scattering to the surrounding areas, the asbestos sprayed onto ceiling or the like is detached from the foundation of the ceiling and then the asbestos is disposed of. However, worker safety needs to be extremely tightly controlled. Further because asbestos easily scatters in the air, the measure of preventing the asbestos from being scattered to the surrounding areas is an extremely laborious task. In addition, the asbestos thus detached and collected cannot be discarded as is and, further, asbestos is resistant to corrosion. Therefore, a permanent measure for the disposal of asbestos is required in which the health of workers and the prevention of scattering of asbestos to the surrounding areas are taken into consideration, thereby requiring much greater costs for the disposal. Of course, it is obvious that subsidiary materials and the like that are used in the disposal work should be completely disposed of.

At present, asbestos and asbestos-containing material are buried in a final landfill site as specially controlled industrial waste, but this is not without limit. For this reason, various kinds of asbestos detoxification technologies have been proposed hitherto. A representative example thereof is a melting method using a sealed electric furnace (Japanese Patent No. 3085959).

In the above document, a detoxification method is disclosed by which asbestos collected in a bag through a chute is melted at high temperature in a sealed electric furnace. An example of a further-developed method thereof is a method in which asbestos that is detached from the surface of a base material is placed in a calcium bag, and is incinerated along with the bag. However, the asbestos detoxification method, even though it employs treatment using an sealed electric furnace, requires a treatment temperature of at least 1000° C. and preferably at least 1500° C., raising the problem of enormous energy consumption, so that the method has not yet been practically applied.

On the other hand, as an asbestos detoxification method, another technique has been disclosed (Japanese Patent Application Laid-Open No. 2005-134554). In this technique, asbestos and a chlorofluorocarbon decomposition product are mixed and the resulting mixture is subjected to heat treatment so as to detoxify the asbestos. However, a large amount of powder dust is unavoidably produced when an existing asbestos layer is detached, and powder dust is also produced when the asbestos to be treated is transported or when the asbestos is mixed with the chlorofluorocarbon decomposition product. The workers and people in the surrounding areas are undeniably affected. Furthermore, the technique of decomposing chlorofluorocarbon is an extremely difficult technique and also expensive and, therefore, has a huge problem in practical application.

DISCLOSURE OF THE INVENTION

Problems to be Solved by the Invention

The present invention provides an asbestos detoxification method by which it is possible to securely detoxify asbestos sprayed onto the surface of a base material of, for example, a building at low energy. More specifically, the present invention provides an asbestos detoxification method by which the asbestos on the surface of a base material of, for example, a building is treated prior to the detachment from the surface so that the scattering of the asbestos is suppressed and, thereafter, the asbestos is detached, and it is possible to securely detoxify the asbestos at low energy. Furthermore, the present invention provides a method by which various kinds of subsidiary materials that are used in the detoxification and that need to be disposed of as specially controlled industrial waste are also simultaneously disposed of, thereby further perfecting the detoxification.

Means for Solving the Problems

The summary of a first invention (claim 1) relates to an asbestos detoxification method for disposing of an existing asbestos layer sprayed onto a surface of a base material such as a base material of a building, the method comprising: a step A1 of impregnating the asbestos layer with an asbestos melting agent and then detaching the asbestos layer; a step A2 of pulverizing the existing asbestos layer; a step A3 of loading the pulverized material obtained in step A2 into a melting furnace; and a step A4 of heating and melting the pulverized material in the melting furnace.

The summary of a second invention (claim 2) relates to an asbestos detoxification method for disposing of an existing asbestos layer sprayed onto a surface of a base material such as a base material of a building, the method comprising: a step B1 of impregnating the asbestos layer with an asbestos melting agent and then detaching the existing asbestos layer; a step B2 of pulverizing the existing asbestos layer; a step B3 of loading the pulverized material obtained in step B2 into a melting furnace; a step B4 of heating a resin subsidiary material used in disposal of the asbestos layer to vaporize a resin portion thereof and further converting the vaporized resin portion into plastic oil; a step B5 of combusting either or both of the plastic oil obtained in step B4 and a fuel; and a step B6 of heating and melting the pulverized material in the melting furnace using the heat obtained in step B5.

The summary of a third invention (claim 3) relates to an asbestos detoxification method for disposing of an existing asbestos layer sprayed onto a surface of a base material such as a base material of a building, the method comprising: a step C1 of impregnating the asbestos layer with an asbestos melting agent and then detaching the existing asbestos layer; a step C2 of pulverizing the existing asbestos layer and a resin subsidiary material used for disposal of the asbestos layer; and a step C3 of heating the pulverized material obtained in step C2 to vaporize a resin portion thereof and to separate the resin portion from an asbestos portion; and a step C4 of loading the asbestos portion separated in step C3 into a melting furnace; a step C5 of converting the vaporized resin portion into plastic oil and combusting either or both of the oil and a fuel; and a step C6 of heating and melting the pulverized material in the melting furnace using the heat obtained in step C5.

The summary of a fourth invention (claim 4) relates to an asbestos detoxification method for disposing of an asbestos-containing building material, comprising a step D1 of pulverizing the building material; a step D2 of loading the pulverized material obtained in step D1 into a melting furnace; and a step D3 of heating and melting the pulverized material in the melting furnace.

Effect of the Invention

The first invention provides a method of detoxifying an asbestos layer sprayed onto the surface of a base material such as the base material of a building, and a method by which it is possible to totally detoxify asbestos without scattering of asbestos powder dust can be provided. Furthermore, the disposal may be performed at low temperature and the effects thereof are extremely efficient. The asbestos layer may be used as it is while a binder is solidified, and then the asbestos layer may be detached and disposed.

The second and third inventions provide a disposal method in which the first invention is improved to be more effective, and a method by which it is possible to perform detoxification without scattering of asbestos powder dust during disposal, and also totally dispose of subsidiary materials used during disposal, can be provided. Furthermore, the disposal may be performed at low temperature and the effects thereof are extremely efficient. In particular, the second and third inventions provide methods by which various kinds of subsidiary materials that are used in the detoxification and are required to be disposed of as specially controlled industrial waste are recycled at the same time.

The fourth invention provides a method of detoxifying an asbestos-containing building material, and a method by which it is possible to totally detoxify asbestos without scattering of asbestos powder dust. Furthermore, the disposal can be performed at low temperature and the effects thereof are extremely efficient.

BEST MODE FOR CARRYING OUT THE INVENTION

Figure 1:
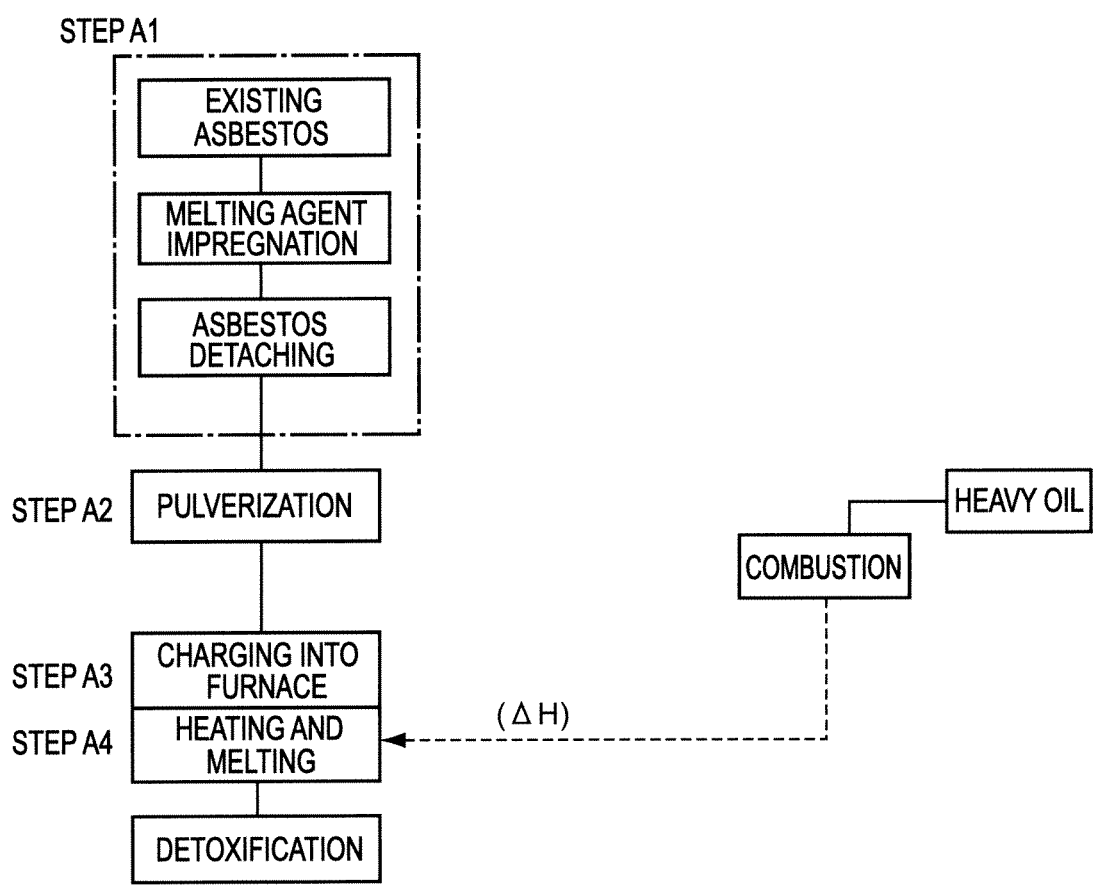
FIG. 1 An asbestos detoxification method according to the first invention is illustrated.

Hereinafter, the present invention, each invention respectively, will be described.

<First Invention>

The first invention will be described at first, but the following description basically commonly applied to the first to the third inventions.

The asbestos detoxification method according to the first invention includes step A1 to step A5 and is a technique by which asbestos is contained, removed and melted, and this process is combined with detoxification. Specifically, an asbestos layer sprayed onto the surface a base material such as iron frame or a base material of a building, typical examples thereof including ceiling, is contained at first; further, after the asbestos layer is detached, the detached material is heated at low temperature so as to be detoxified. Asbestos disposable herein is not particularly limited, but includes all kinds of asbestos such as chrysotile, crocidolite, amosite, anthophyllite, tremolite, or actinolite.

"Step A1"

In the present step, an asbestos melting agent is impregnated into an asbestos layer formed on the surface of a base material such as a base material of a building and, if necessary, the asbestos layer is solidified as it is with the help of a binder. Namely, in the step, a melting agent reacting with asbestos is dispersed in the asbestos layer, and then the asbestos layer is detached.

When described more specifically, the present step includes (a) treating an asbestos layer formed on the surface of a base material such as concrete or an iron frame by spraying or the like; (b) dispersing an asbestos melting agent in the asbestos layer and, if necessary, spraying the agent with a binder, or inserting a spray nozzle in the asbestos layer and spraying the agent into the inside of the asbestos layer to impregnate the asbestos layer with the agent; (c) if necessary, solidifying thereof; and (d) detaching the asbestos layer.

"Step A2"

In the present step, the asbestos layer detached in step A1 is pulverized. Specifically, the asbestos layer is loaded through a hopper and pulverized, for example, with a screw or the like.

"Step A3"

In the present step, the pulverized material obtained in step A2 is loaded into a melting furnace. The melting furnace is equipped with a heating device connected to a heat source.

"Step A4"

In the present step, the pulverized material in the melting furnace is heated and melted.

An additional step of combusting a fuel such as heavy oil may be involved and the heat thereof may be used as the heat source for heating and melting in the present step.

Hereinafter, the first invention is further described. The place at which the detoxification is carried out is not particularly limited, and the detoxification may be carried out at any place including a work site where the asbestos layer is detached, in the transportation, and a site for discarding. In this case, it is needless to say that a melting furnace may be installed on a vehicle and the disposal may be carried out in the melting furnace on the vehicle, or a melting furnace may be installed at each work site and the disposal may be carried out at the site. In addition, there is not any particular limitation on the method and timing of impregnating the melting agent into the asbestos. The asbestos may be impregnated with the melting agent before being loaded into the melting furnace, or these may be mixed in the melting furnace for impregnation. Either operation may be applied.

In particular, the first invention has a feature that the melting furnace can be installed at the work site where the asbestos is detached, and the disposal of asbestos, specially controlled industrial waste, can be performed. Namely, it is possible that a melting furnace that heats and detoxifies the asbestos layer detached (and if necessary, solidified) is installed on a vehicle or at a work site and is operated and the detached asbestos is melted at the work site where the asbestos is detached. The melting condition is, although it depends on the size and performance of the melting furnace and also on the amount of the asbestos, generally selected to be about 700° C. and about 1 to 2 hours, so that the asbestos is melted, detoxified, and converted into a non-fibrous state, and that safety transportation is enabled. Furthermore, the waste that is thus melted and reduced in weight can be subjected to final disposal.

In order to detoxify asbestos at low energy, it is effective to find out a melting agent that allows asbestos to be melted at a temperature as low as possible. The present inventor focused his attention on a calcium compound and selected it as the melting agent. The melting agent is usable in any form including a powder form, a semi-unprocessed form, and a slurry form. Specifically, for example, the calcium compound is heated at a low temperature equal to or lower than 600° C. (for example, 575° C.) for a predetermined time (for example, 2 hours). According to the present invention, it is possible to securely decompose asbestos at low energy (at a heating temperature equal to or lower than 600° C.). That is, detoxification can be achieved by disappearance of the fibrous form of asbestos, collapse of the crystal structure, and the like.

The asbestos melting agent is impregnated into the asbestos layer. Specific examples thereof may include a calcium compound, and preferably calcium fluoride, calcium carbonate, calcium oxide, calcium chloride, and calcium hydroxide. These compounds may be used solely or as a mixture thereof.

Examples of the method of dispersing and impregnating the asbestos melting agent into the asbestos layer may include: a first method in which the asbestos melting agent is sprayed onto the asbestos surface directly or with a binder so as to impregnate the agent into the asbestos layer and, if necessary solidify thereof; and a second method in which a nozzle spraying the asbestos melting agent directly or with a binder is inserted in a manner that the nozzle reaches the body, then the agent is sprayed so as to be impregnated in the asbestos layer and, if necessary solidification is carried out. Further, in a third method, the asbestos is directly dipped into a binder for asbestos for impregnation. It is preferable that the binder is solidified after the nozzle is removed.

When the nozzle is used, if necessary, a sealing layer may be formed on the surface of the asbestos layer. Whereby, scattering of asbestos is suppressed, so that safety is secured during work or into the future. The sealing layer is needed particularly when the asbestos layer is directly exposed, and is not needed when the asbestos layer has already been covered with a sufficient layer (sealing layer). When a new sealing layer is formed, the layer is made from a binder as it is or from a material in which a slight modification is added to the binder.

As the binder for asbestos, a water-soluble polymer or a polymer latex may be used. As the water-soluble polymer, not only a water-soluble urea-formamide resin or a guanamine resin but also polyvinylalcohol, methylcellulose, polyvinyl pyrrolidone, or the like may be used. As the polymer latex, a styrene-butadiene latex, an acryl latex, a vinylidene chloride latex, a vinylchloride latex, a vinylacetate latex, or the like may be used.

In addition to that, a cationic styrene-butadiene copolymer, a carboxy-modified styrene-butadiene copolymer (emulsion type), a cyclohexylmethacrylate copolymer, and a copolymer (emulsion type) of cyclohexylmethacrylate and an α-olefin, a vinylesters, a halogenated vinyl compound or the like are particularly preferable. The material is a composition of an acrylic acid ester copolymer emulsion and water, and a more preferable example is a mixture of a cationic styrene-butadiene copolymer and a cyclohexylmethacrylate copolymer that is described in Japanese Patent Application Laid-Open No. 2007-308871. The binder is required to have weather resistance, adhesiveness, deformation follow-up property, and the like, and the above mixture is excellent in particular.

Specific examples of the binder for asbestos include an acrylic acid ester copolymer emulsion, and a mixture of a cationic styrene-butadiene copolymer and a cyclohexylmethacrylate copolymer, and preferable examples include a composition of an acrylic acid ester copolymer emulsion and water.

As the best embodiments of the binder, usually an acrylic acid ester copolymer emulsion or a mixture of a cationic styrene-butadiene copolymer and a cyclohexylmethacrylate copolymer may be mentioned, and specifically a mixture of an acrylic acid ester copolymer emulsion and water. The asbestos melting agent represented by the calcium compound is dispersed in such a binder.

<Second Invention>

Hereinafter, the second invention will be additionally described.

"Step B1" to "Step B3"

These steps are similar to step A1 to step A3 of the first invention.

"Step B4"

In the present step, a resin subsidiary material used in the disposal of the asbestos layer is heated and the resin portion thereof is vaporized and converted into plastic oil. It is needless to say that a non plastic oil portion (asbestos portion) which is not the resin portion may also be collected. In the present invention, an equipment that converts plastics into oil and is used in the process of producing the plastic oil is required. The equipment may be installed at each detoxification site described in the first invention, or at the another site, and that it is needless to say that the plastic oil produced at this site may be used. Further, in this case, the equipment may be installed together with the melting furnace at the work site where the asbestos is detached, and the disposal of asbestos, specially controlled industrial waste, can be be performed.

The subsidiary materials that are converted into the plastic oil in the present step include, for example, a resin sheet that covers completely the work site where the detaching is carried out and a plastic bag keeping asbestos therein. These are used in an extremely large amount and are required to be totally disposed of. The same applied to work suits that workers wear.

Particularly in the second invention, by adding the present step, it is intended that all of the wastes discharged during disposing the asbestos layer are disposed of along with asbestos. Namely, the second invention is characterized by additionally involving a technique of converting resin into oil that is one of so-called waste resin disposing processes. Regarding the process of converting waste resin into oil and the equipment used therefor. There have been a number of proposals so far, and they are not particularly limited, but in one example, a method of thermally decomposing and converting the subsidiary materials into oil and using the plastic oil thus obtained and collected as a fuel is widely known, and examples thereof include a method of melting and thermally decomposing an objective thermoplastic resin so as to convert the resin into plastic oil, and to use the oil thus obtained and collected as a fuel (Japanese Patent Application Laid-Open No. 49-017477 and Japanese Patent Application Laid-Open No. 59-174689).

"Step B5"

In the present step, either or both of the plastic oil obtained in step B4 and a fuel are combusted. The present step serves as a heat source for step B6. The plastic oil may be used as a fuel for an electric power generator that supplies electric power to an electric furnace serving as the melting furnace.

Step B6

The present step is similar to step A4 in the first invention. In the present step, the pulverized material in the melting furnace is heated and melted by using the heat obtained in step B5.

<Third Invention>

The outline of the third invention is described below.

"Step C"

The present step is similar to step A2 in the first invention.

"Step C2"

In the present step, the existing asbestos layer in step C1 and the plastic subsidiary materials used in the disposal of the asbestos layer are pulverized at the same time.

"Step C3"

In the present step, the pulverized material obtained in step C2 is heated and the resin portion thereof is vaporized and separated from the asbestos portion. Specifically, the pulverized material is heated at a temperature from about 300° C. to about 500° C. so as to vaporize the resin portion of the pulverized material and to separate it from the non-vaporized portion (asbestos portion).

"Step C4"

In the present step, the asbestos portion separated in step C3 is loaded into the melting furnace.

"Step C5"

In the present step, the resin portion obtained in step C3 is converted into plastic oil, and either or both of the plastic oil and a fuel are combusted. Through this step, the resin portion contained in the subsidiary materials can be totally converted to fuel. Similarly to step B of the second invention, the plastic oil may be also used as a fuel for an electric power generator that supplies electric power to an electric furnace serving as the melting furnace.

"Step C6"

In the present step, the pulverized material loaded into the melting furnace is heated and melted by using the heat obtained in step C5. Through this step, the resin portion can be totally recycled as fuel and the asbestos detoxification can also be promoted.

<Forth Invention>

The asbestos detoxification according to the fourth invention includes step D1 to step D3, and is a method and technology in which asbestos-containing building material is pulverized as it is, melted, and detoxified. Specifically, in the method asbestos-containing building material such as a gypsum board, a ceiling material board, or a fire-retardant board is detached from a building, and then the building material is heated at low temperature so as to be detoxified. The asbestos that can be subjected to the disposal herein includes all of those explained in the foregoing description of the asbestos layer.

"Step D1"

In the present step, asbestos-containing building material detached from building is pulverized. Specifically, similarly to step A1, the building material is loaded through a hopper and pulverized, for example, with a screw or the like.

Step D2

In the present step, the pulverized material obtained in step D1 is loaded into a melting furnace. The melting furnace is equipped with a heating device that connects to a heat source.

Step D3

In the present step, the pulverized material in the melting furnace is heated and melted.

As a heat source for heating and melting in the present step, similarly to step A4, a step of combusting heavy oil or the like may be further added and the resulting heat thereof may be used.

Example

Hereinafter, the present invention will be further described with reference to the following actual specific examples.

First Invention

FIG. 1 shows the outline of the first invention. The first invention includes disposal of an existing asbestos layer (step A1 to step A3) and step A4 of heating and melting pulverized material obtained by these steps in a melting furnace. If necessary, a step of combusting fuel so as to supply heat to the melting furnace may be added. Regarding the fuel, usually heavy oil or the like may be used as a heat source.

Figure 4:
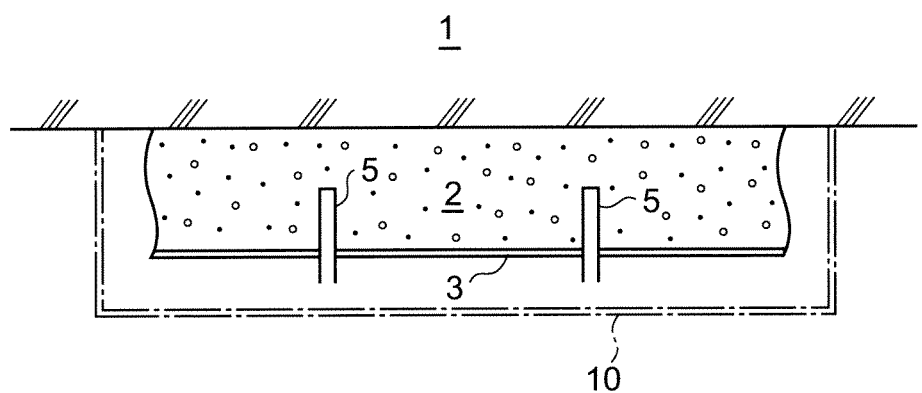
FIG. 4 A specific example of asbestos layer disposal according to the first to the third inventions is illustrated.

FIG. 4 shows an asbestos layer according to the present invention, and 1 denotes a ceiling concrete and 2 denotes an asbestos layer which is sprayed onto the surface of the concrete ceiling 1. 3 is a binder layer formed by spraying and solidifying a binder on the surface of the asbestos layer 2. A spray nozzle 5 pierces the binder layer (sealing layer) 3 to enter the asbestos layer 2; and a binder in which an asbestos melting agent is dispersed is sprayed into the inside of the asbestos layer 2 so as to impregnate and solidify the binder in the asbestos layer 1. In the figure, the reference number 10 indicates a subsidiary material that covers the whole work site when asbestos is disposed of. The subsidiary material is subjected to conversion into plastic oil in step B4 to step B5.

As the binder layer 3, a mixture of a cationic styrene-butadiene copolymer and a cyclohexylmethacrylate copolymer is used, and thereto, calcium fluoride and calcium carbonate (inorganic calcium compounds) that serve as an asbestos melting agent are mixed. The weight ratio of the melting agent to asbestos was about 3 to 2.

The asbestos layer 2 impregnated with the binder in which the asbestos melting agent was dispersed was detached from the surface of the concrete 1. During this detaching, no asbestos scattered.

Second Invention

Figure 2:
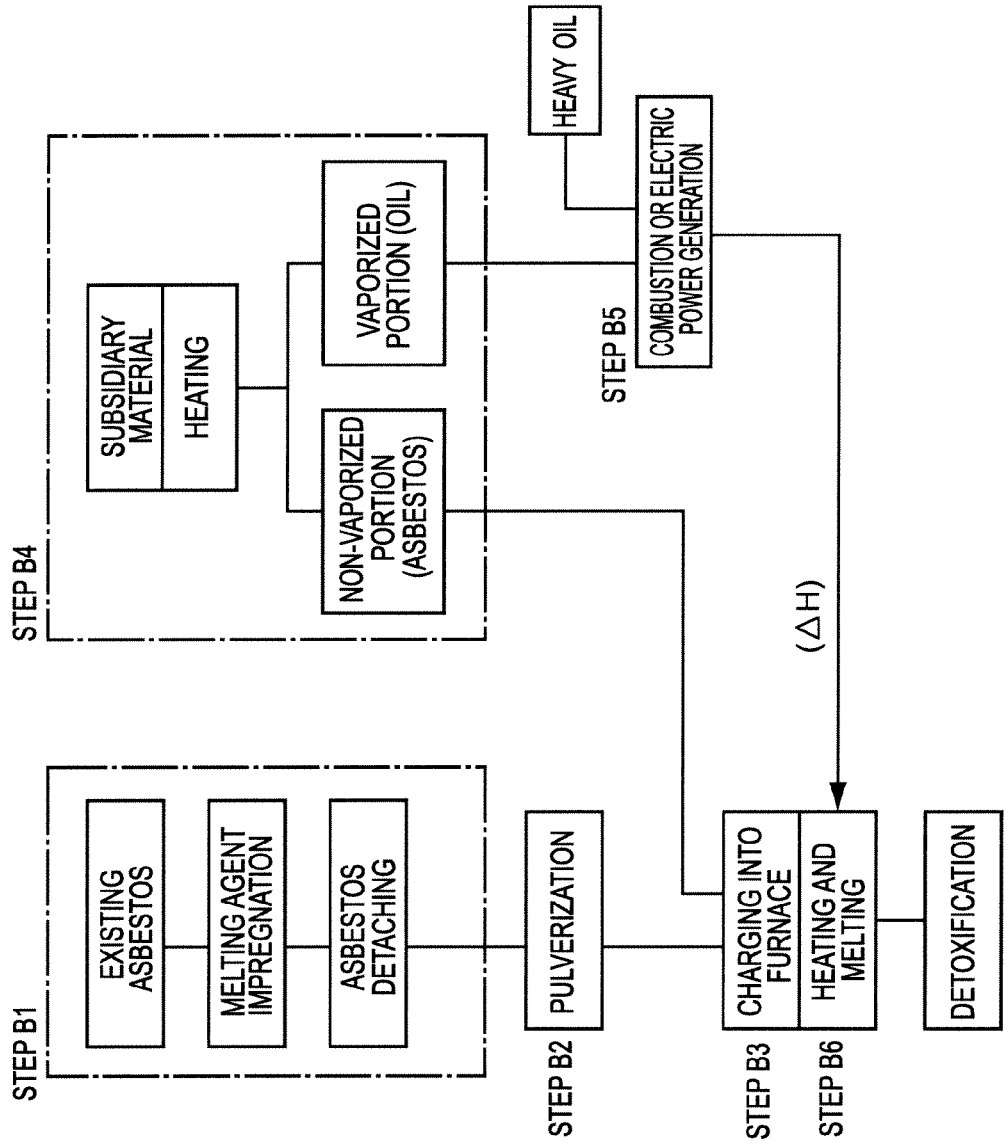
FIG. 2 An asbestos detoxification method according to the second invention is illustrated.

The second invention, as shown in FIG. 2, includes all of the steps of the first aspect and further includes not only step B5 of combusting fuel and the like and step B6 of heating and melting the pulverized material using the heat obtained in step B5, but also step B4 of converting the subsidiary materials used in the disposal of the asbestos layer into plastic oil, which is used as a combustion fuel or a power generation fuel in step B5 and serves as a heat source in step B6. When the amount of the fuel required is not covered only by the plastic oil, heavy oil or the like may be added to the heat source, for example.

Regarding the subsidiary materials in the second invention, cover sheets and work suits that are made of mainly polyethylene are subjected to the treatment of conversion into plastic oil. From About 1 kg of the subsidiary materials, about 900 g of plastic oil was obtained. The subsidiary materials are not limited to polyethylene, but it is needless to say that the subsidiary materials may be polystyrene, polypropylene, or the like.

Figure 3:
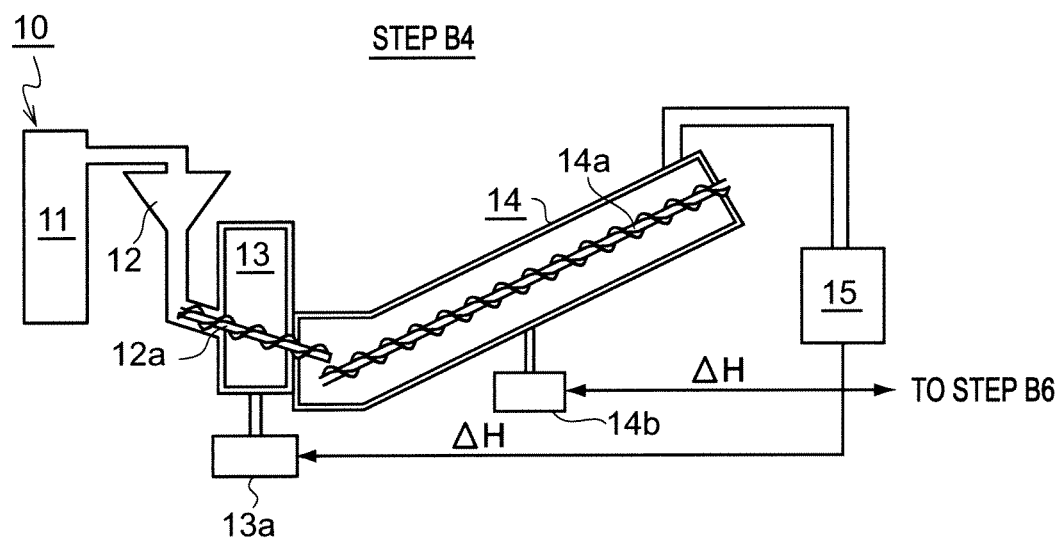
FIG. 3 Step B4 of the second invention is illustrated.

FIG. 3 shows the outline of step B4 of the second invention. Generally, the step may be roughly divided into a pretreatment device 11 that pulverizes or crushes (pelletizes or shreds into small chips) subsidiary material 10, a hopper 12 through which raw materials are loaded, a melting furnace 13, a gas decomposition device 14, a separator 15, and a product tank 16.

These will be described briefly sequentially. At first, the subsidiary material 10 is, as dried waste plastics source material, pelletized and crushed into small chips with the pretreatment device 11, supplied with a fixed quantity supply device to the raw material feeding hopper 12, and then fed with a screw 12a or the like to the melting furnace 13. The melting furnace 13 is equipped with a hot air generator 13a. The raw materials are melted by heating the melting furnace. The melted raw materials are vaporized with the gas decomposition device 14 and fed to the upper portion of an inclined tube 14a. The inclined tube 14a produces "heat gradient" by temperature difference developed from the lower portion to the upper portion thereof, so that each raw material causes primary decomposition and vaporizes respectively in a temperature zone corresponding to each raw material. The reference number of 14b indicates the hot air generator.

Furthermore, because the temperature of the inclined tube 14a goes high toward the upper portion thereof, the vaporized gas causes naturally secondary decomposition depending on the material thereof. Then, the secondary decomposition gas taken out is, if necessary neutralized with a shower ring of aqueous alkali, and finally introduced into an oil tank 15. If necessary, separation by distillation is carried out so as to extract and collect each oil fraction.

The plastic oil collected in the oil tank 15 is used as combustion fuel (around 700° C.) or fuel for an electric power generator that supplies electric power to the electric furnace serving as the melting furnace. The plastic oil is introduced into the hot air generator 13a or 14b and is used therein as a heat source, and is introduced into the melting furnace in step B6 for asbestos detoxification.

Regarding heat treatment of the asbestos layer, the detached asbestos (with the melting agent) and the same kind of asbestos that is used as a comparative example (free of the melting agent) are loaded in the melting furnace and heated for 1 to 2 hours in the electric furnace that was kept at a predetermined temperature (500° C. to 700° C. for the former and 1000° C. for the latter) by using heavy oil and the plastic oil as fuel. In this way, treated asbestos was obtained.

In the present invention, thus collected plastic oil is used as a heat source in step B6, and the heat source is supplied to the equipment converting plastics into oil or to the asbestos melting furnace so as to heat and melt the asbestos layer. By virtue of this, the wastes other than asbestos, which are discharged in the course of the asbestos disposal and are needed to be disposed of, are allowed to be completely vanished along with asbestos disposal.

Evaluation

Microscope observation showed that, in the former example, fibrous portion was reduced, and no fibrous portion was found after 700° C. treatment. In the latter example, fibrous portion was not decomposed and remained. From this result, it was found that the asbestos melting agent specified in the present invention had a function of promoting asbestos decomposition.

Scanning electron microscope observation showed that fibrous portion was not found in the former. This result shows that biological effect became reduced.

Further, the result of X-ray diffraction showed that asbestos (general composition formula: $Mg_3Si_2O_5(OH)_4$) decomposed and reacted with the asbestos melting agent according to the present invention, as a result, decomposed into cuspidine ($Ca_4Si_2O_7F_2$) and magnesium oxide (MgO). It is considered that the OH group of asbestos is eliminated, and forsterite ($Mg_2SiO_4$) is formed, which then reacts with the asbestos melting agent of the present invention and decomposes.

Third Invention

Figure 5:
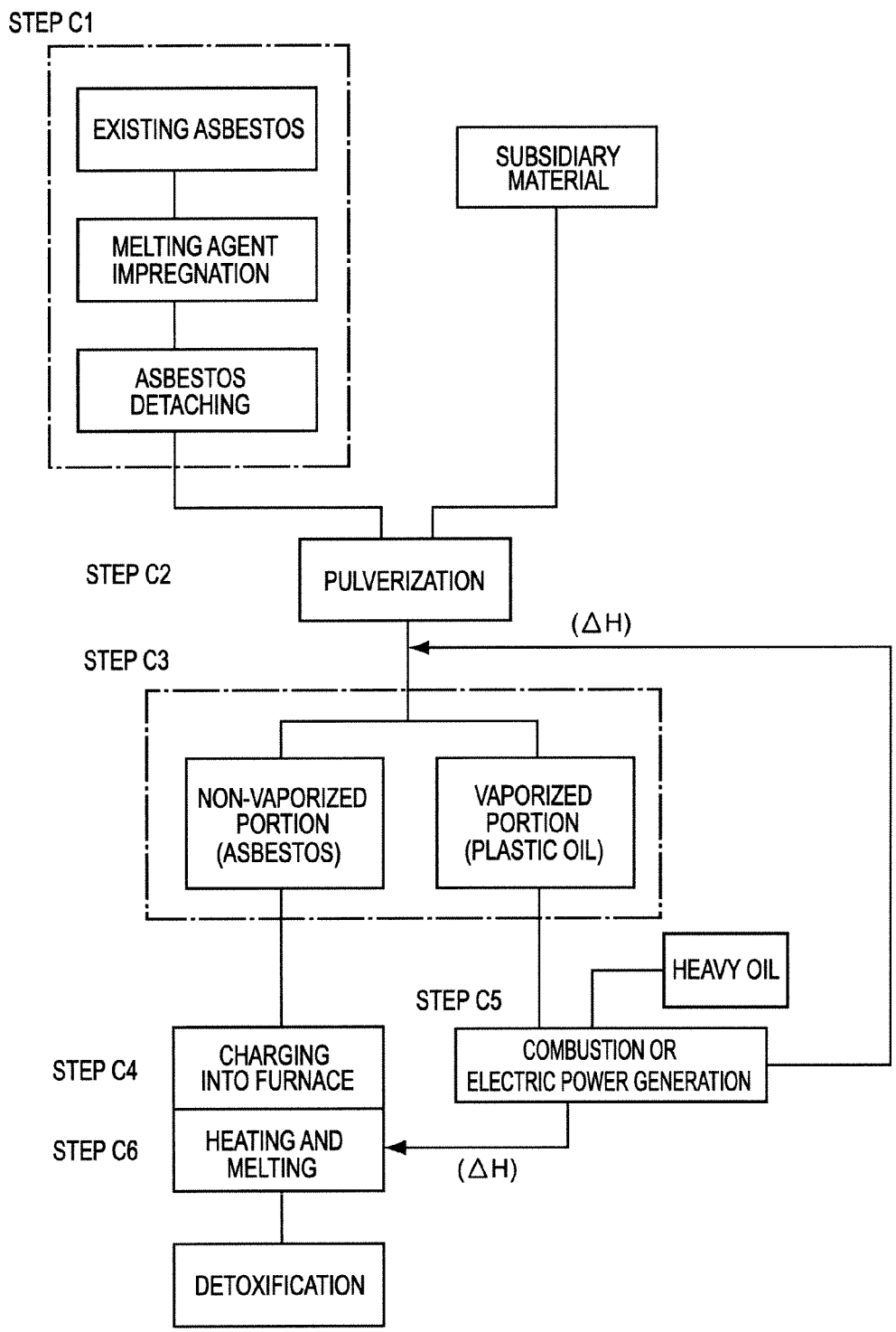
FIG. 5 An asbestos detoxification method according to the third invention is illustrated.

FIG. 5 shows the outline of the third invention. In the third invention, the disposal of the existing asbestos layer and the disposal of subsidiary materials are basically carried out at the same time (step C1 step to step C4), and the plastic oil obtained from the subsidiary materials (step C3 step, step C5) is used as fuel providing a heat source (step C6). When the amount of the fuel required is not covered only by the plastic oil, heavy oil or the like may be added to the heat source, for example.

Fourth Invention

The outline of the fourth invention is similar to the first invention, except that step A1 of the first invention is replaced by a step of detaching an asbestos-containing building material from building.

INDUSTRIAL APPLICABILITY

The present invention, which is configured as described above, enables disposal of an asbestos layer sprayed on the surface of a base material such as a ceiling, a wall, or an iron frame without detaching or removing the asbestos layer from the surface, safe disposal operations, and reduced process costs. As an asbestos disposal process, an extremely wide range of applications is expected, including asbestos detoxification by heating asbestos at low temperature. It is needless to say that asbestos that can be disposed of by the invention is not limited to sprayed asbestos, but any building material containing asbestos can be similarly detoxified.

The disclosure of Japanese Patent Application No. 2007-061291 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An asbestos detoxification method for disposing of an existing asbestos layer sprayed onto a surface of a base material, the method comprising:
   a step C1 of impregnating an existing asbestos layer sprayed onto a surface of a base material with an asbestos melting agent and then detaching the existing asbestos layer from the surface of the base material, wherein the asbestos melting agent is at least one calcium compound selected from the group consisting of calcium fluoride, calcium carbonate, calcium oxide, and calcium hydroxide;
   a step C2 of pulverizing the detached asbestos layer and a resin subsidiary material used for disposal of the asbestos layer;
   a step C3 of heating the pulverized material obtained in step C2 to vaporize a resin portion thereof and to separate the resin portion from an asbestos portion;
   a step C4 of loading the asbestos portion separated in step C3 into a melting furnace;
   a step C5 of converting the vaporized resin portion into plastic oil and combusting either or both of the oil and a fuel; and a step C6 of heating and melting the asbestos portion in the melting furnace using the heat obtained in step C5.

2. The asbestos detoxification method according to claim 1, comprising an additional step of loading the fuel into the melting furnace.

3. The asbestos detoxification method according to claim 2, wherein the fuel is heavy oil.

4. The asbestos detoxification method according to claim 1, comprising an additional step of loading a non plastic oil portion obtained in step C5 into the melting furnace.

5. The asbestos detoxification method according to claim 1, wherein the asbestos melting agent is dispersed in a binder for asbestos.

6. The asbestos detoxification method according to claim 5, wherein the binder for asbestos is an acrylic acid ester copolymer emulsion or a mixture of a cationic styrene-butadiene copolymer and a cyclohexylmethacrylate copolymer.

7. The asbestos detoxification method according to claim 6, wherein the binder for asbestos is the mixture of a cationic styrene-butadiene copolymer and a cyclohexylmethacrylate copolymer.

8. The asbestos detoxification method according to claim 5, wherein the binder for asbestos is a composition of an acrylic acid ester copolymer emulsion and water.

9. The asbestos detoxification method according to claim 5, wherein the binder for asbestos is solidified after impregnating the asbestos layer with the asbestos melting agent.

10. The asbestos detoxification method according to claim 1, wherein a binder for asbestos in which the asbestos melting agent is dispersed is spray coated onto the surface of the existing asbestos layer, so that the asbestos layer is impregnated with the binder for asbestos.

11. The asbestos detoxification method according to claim 1, wherein the existing asbestos layer is dipped in a liquid of a binder for asbestos in which the asbestos melting agent is dispersed, so that the asbestos layer is impregnated with the binder for asbestos.

12. The asbestos detoxification method according to claim 1, wherein a nozzle is inserted into the existing asbestos layer, and a binder for asbestos in which the asbestos melting agent is dispersed is sprayed into the existing asbestos layer through the nozzle, so that the asbestos layer is impregnated with the binder for asbestos.

13. The asbestos detoxification method according to claim 1, wherein the subsidiary material is a resin sheet covering a work site, or a work suit.

14. The asbestos detoxification method according to claim 1, wherein the asbestos layer impregnated with the asbestos melting agent and a binder for asbestos is heated in the melting furnace, which is installed on a vehicle or a work site where the asbestos layer is detached.

15. The asbestos detoxification method according to claim 1, wherein the asbestos melting agent comprises calcium oxide.

16. The asbestos detoxification method according to claim 1, comprising heating and melting the asbestos portion in the melting furnace at a temperature equal to or below 700° C.

* * * * *